Oct. 8, 1940.　　　L. W. GUYER　　　2,217,479

DAMPER REGULATOR FOR DAMPERS OF VENTILATING DUCTS

Filed June 22, 1939

Inventor
Lionel Walter Guyer

By Carl Miller
Attorney

Patented Oct. 8, 1940

2,217,479

UNITED STATES PATENT OFFICE 2,217,479

DAMPER REGULATOR FOR DAMPERS OF VENTILATING DUCTS

Lionel Walter Guyer, Virginia, Minn.

Application June 22, 1939, Serial No. 280,481

3 Claims. (Cl. 98—41)

This invention relates to damper regulators for air conditioning ducts.

The principal object of this invention is to provide a damper regulator for use with a damper of an air conditioning duct, the damper regulator being of a simple construction and which may be easily applied to the duct and connected to the damper; which is also simple to adjust so as to regulate the position of the damper to control the flow of air through the duct and which may be locked in adjusted position; the damper regulator comprising a minimum of parts, is cheap to manufacture and efficient in use; cannot get out of order or adjustment and which may be quickly attached to a ventilating duct and damper with a minimum of effort.

With the foregoing and other objects in view, the invention resides in the novel arrangement and combination of parts and in the details of construction hereinafter described and claimed, it being understood that changes in the precise embodiment of the invention herein disclosed may be made within the scope of what is claimed without departing from the spirit of the invention.

Figure 1:
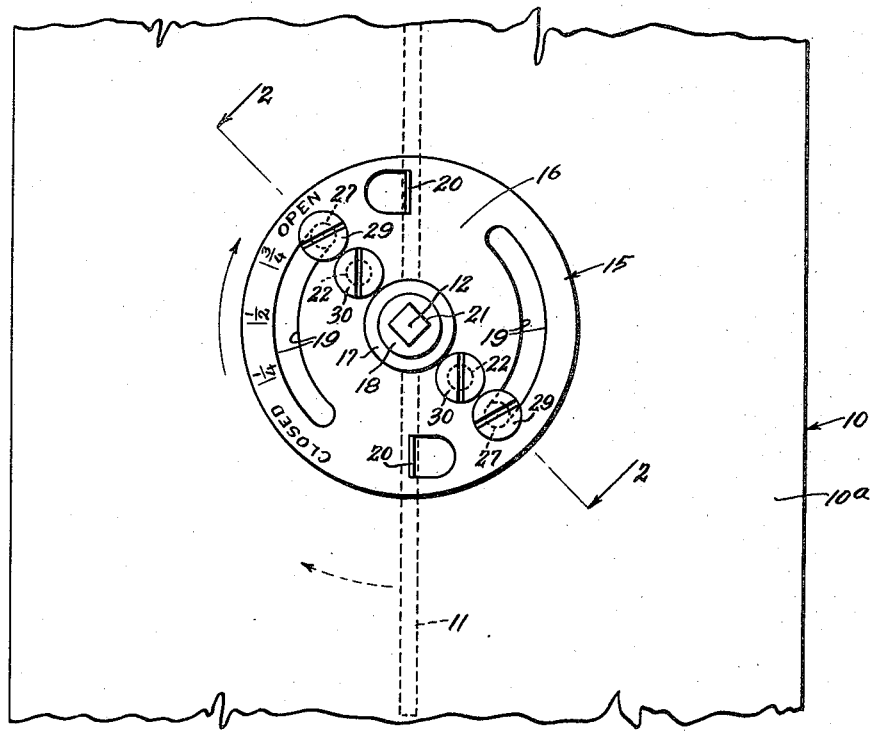
Figure 2:
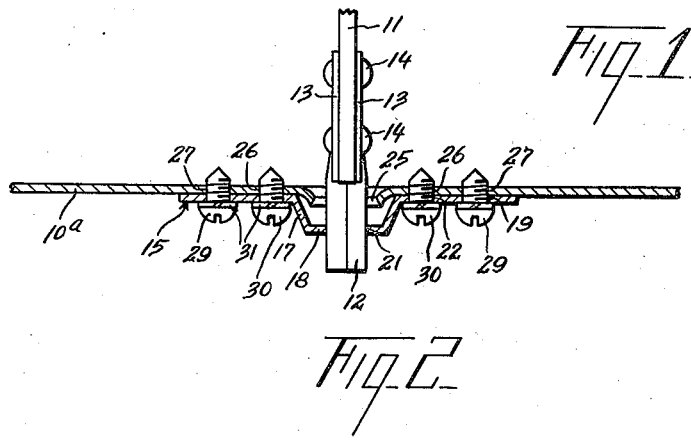

A practical embodiment of the invention is illustrated in the accompanying drawing, wherein:

Figure 1 shows in plan view the damper regulator mounted on a ventilating duct, and Figure 2 is a cross-sectional view of the damper regulator taken on line 2—2, Figure 1.

Referring to the drawing, 10 denotes a sheet metal air conditioning ventilating duct of any desired shape or size provided with a damper 11 therein operable to control the flow of air through the duct in the manner well known. The damper 11 constituting a flat plate is rotatably supported within the duct 10 by stud shafts rigidly connected thereto and each rotatably supported in suitable bearings mounted on opposed walls of the duct. One such stud shaft 12 is shown formed as an integral extension of attaching plate members 13 which are rigidly secured to the damper 11 by means of rivets 14. Obviously any other suitable means may be utilized for securing the stud shaft to the damper. Preferably the stud shaft 12 is formed at least at its free end portion square in cross-section for a purpose to be hereinafter described.

The damper regulator 15 is formed as a sheet metal stamping and comprises a flat circular body portion 16 having at its center a boss 17 provided with an end wall 18. On each side of the boss 17, there is provided in the body portion 16, a sector shaped slot 19, each slot 19 being equal in size and each located at an equal radial distance from the center, with the ends of the slots spaced apart equal distances. Midway between opposed ends of the slots 19 there is struck out from the body portion 16, lugs 20 arranged to lie in the same vertical diametral plane, each being equally disposed from the center of said body portion and located on the same side thereof as the boss 17. The end wall 18 of the boss 17 is provided with a square opening 21 adapted to snugly receive the squared end portion of the stud shaft 12. Also provided in the body portion 16 are a pair of screw receiving openings 22 equally disposed one on each side of the central boss 17 and preferably arranged on a diameter intersecting diametrically opposed ends of the slots 19.

Prior to mounting the damper regulator 15 on the duct 10, the latter is provided with an opening 25 in a wall 10a thereof, through which the stud shaft 12 of the damper 11 is to project. The opening 25 may either be drilled or struck out, and is of a size substantially greater than the width or diameter of the stud shaft 12 so as to permit lateral movement of the latter therein if necessary, in the mounting of the damper regulator. Also formed in the wall 10a are pairs of screw receiving openings 26 and 27 all arranged on the same line, and so positioned that the openings 26 will register with the openings 22, while the openings 27 will register with the slots 19 of the damper regulator when the latter is placed on said wall 10a.

With the damper 11 placed in open position, the regulator 15 is slipped over the stud shaft 12, the squared end thereof extending through and beyond the square opening 21 in the end wall of the boss 17. The position of the regulator on the damper shaft should be such that when the damper is in open position, the diametrically opposed ends at one end of the slots 19 will register with the screw openings 27 in the duct wall 10a, and in a like manner the screw openings 22 on the regulator will register with the screw openings 26 in the wall 10a. A guide screw 29 is placed in each slot and has threaded engagement with the screw openings 27, the heads of said screws frictionally engaging the surface of the body portion 16 while yet permitting rotation of the regulator, the screws 29 serving as a guide means within the slots 19 for rotational adjustment of the regulator as well as a limit means to be engaged by the ends of the slots for limiting such rotational adjusting movement, all in the manner readily apparent. Locking screws 30 inserted through the openings 22 in the regulator 15 and threadedly engaging the screw openings 26 in the wall 10a serve to lock the regulator 15 in its adjusted open position for a corresponding open position of the damper 11. Interposed beneath the heads of each of the screws 29, 30 are lock washers 31.

In order to facilitate adjustment of the damper 11 by means of the regulator 15 the latter is calibrated along one slot 19 to indicate as shown, see Figure 1, positions of the damper from "closed" to "open." In the position of the parts shown the regulator is at "open" position to correspond with the open position of the damper 11.

To readjust the position of the damper 11, the locking screws 30 are removed and by engaging or grasping the lugs 20 with the fingers of the hand or by engaging the shaft 12 by means of a tool, the regulator 15 may be turned in the direction of the arrow, see Figure 1, to effect a corresponding rotation of the damper to any desired selected position. The regulator 15 may be locked in its new adjusted position by drilling additional screw holes in the duct wall 10a to register with the screw receiving openings 26 to receive the locking screws 30. If desired such additional screw openings may be initially provided in the wall 10a to correspond with the calibrated positions of the regulator, such openings being hidden from view by the circular body portion 16 of the regulator.

In some instances it may be desirable to dispense with the use of locking screws 30 and associated screw openings and to utilize the guide screws 29 both as guide and locking screws.

It will be observed that the position of the regulator 15 on the wall 10a and its direction of movement (as indicated by the arrow) with reference to the open position of the damper (shown in dotted lines) is such that rotation of the latter in adjustment thereof from "open" to "closed" position will not be prevented by the guide screws 29. As shown, the length of the slots 19 are such as to permit a 90 degree movement of the damper 11 from its vertical open position to its horizontal closed position.

Having thus described my invention, I claim as new and desire to secure by Letters Patent:

1. A regulating and adjusting device for use with a damper of a ventilating duct comprising a circular plate having a flat body portion and a central boss, a pair of symmetrically disposed sector shaped slots formed in said body portion, one on each side of said boss, screw fastening means arranged one in each said slot for mounting said circular plate on a wall of said duct, said screw fastening means co-acting with said slots both to permit guided rotational movement of said plate as well as to limit such rotational movement in either direction, means rigid with said damper non-rotatably connected to the boss of said plate whereby rotation of said plate will impart a simultaneous rotation of said damper, and a pair of upstanding lugs struck out of the body portion of said plate, said lugs being diametrically aligned in a plane disposed between the opposed ends of said slots and adapted to be grasped to effect rotation of said plate.

2. A regulating and adjusting device for use with a damper of a ventilating duct comprising a circular plate having a flat body portion and a central boss, a pair of symmetrically disposed sector shaped slots formed in said body portion, one on each side of said boss, screw fastening means arranged one in each said slot for mounting said circular plate on a wall of said duct, said screw fastening means co-acting with said slots both to permit guided rotational movement of said plate as well as to limit such rotational movement in either direction, means rigid with said damper non-rotatably connected to the boss of said plate whereby rotation of said plate will impart a simultaneous rotation of said damper, and additional screw fastening means inserted through said body portion and engaging said duct wall for locking said plate in adjusted position.

3. A regulating and adjusting device for use with a damper of a ventilating duct comprising a circular plate having a flat body portion and a central boss, a pair of symmetrically disposed sector shaped slots formed in said body portion, one on each side of said boss, screw fastening means arranged one in each said slot for mounting said circular plate on a wall of said duct, said screw fastening means co-acting with said slots both to permit guided rotational movement of said plate as well as to limit such rotational movement in either direction, a pair of upstanding lugs struck out of the body portion of said plate, said lugs being diametrically aligned in a plane disposed between the opposed ends of said slots and adapted to be grasped to effect rotation of said plate, additional screw fastening means inserted through said body portion and engaging said duct wall for locking said plate in adjusted position, and a stud shaft provided at one end with a pair of laterally spaced flange plates adapted to receive therebetween a portion of said damper and rigidly secured thereto, said stud shaft at its other end being formed to provide an end portion non-circular in cross-section freely extending through an opening in said duct wall, the central boss of said plate having an end wall provided with a non-circular opening corresponding to that of said stud shaft end portion through which the same is adapted to project to effect a non-rotatable connection therewith.

LIONEL WALTER GUYER.